Feb. 13, 1951  G. I. KIRKLAND ET AL  2,541,422
TELEMETRIC TACHOMETER

Filed Oct. 7, 1948  2 Sheets-Sheet 1

INVENTORS.
GLENN I. KIRKLAND
GORDON E. WATERS
BY
ATTORNEY

Feb. 13, 1951  G. I. KIRKLAND ET AL  2,541,422
TELEMETRIC TACHOMETER
Filed Oct. 7, 1948  2 Sheets-Sheet 2
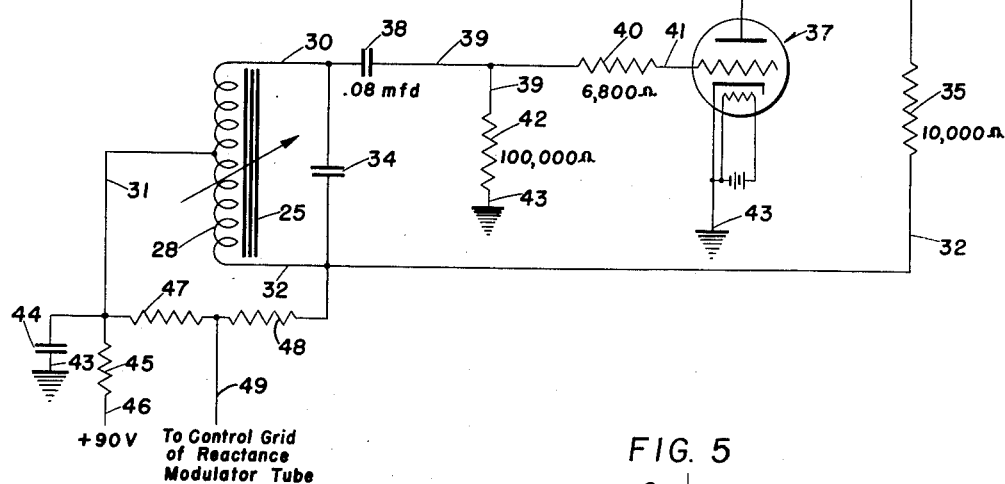
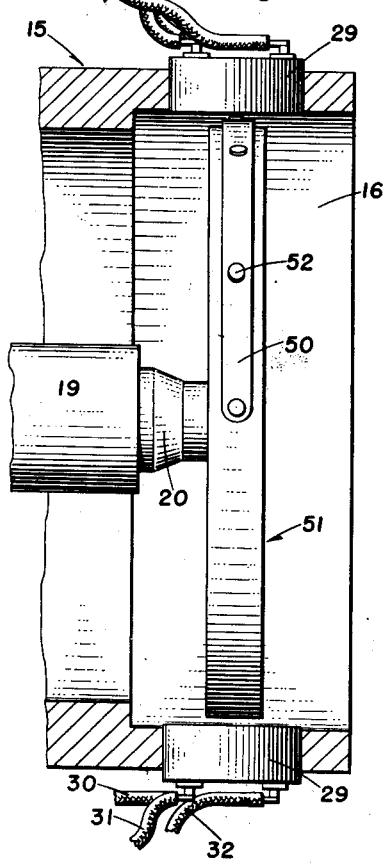
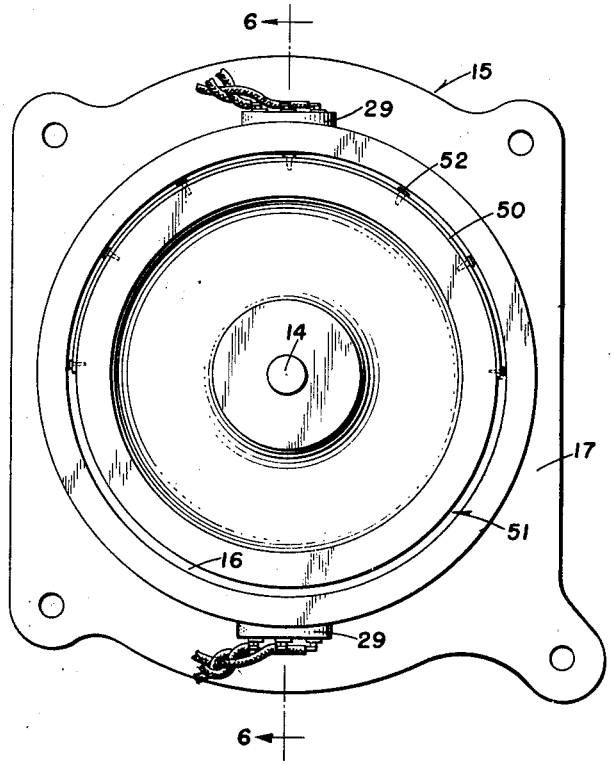
INVENTORS.
GLENN I. KIRKLAND
GORDON E. WATERS
BY
ATTORNEY Patented Feb. 13, 1951

2,541,422

UNITED STATES PATENT OFFICE 2,541,422

TELEMETRIC TACHOMETER

Glenn I. Kirkland, Silver Spring, and Gordon E. Waters, College Park, Md., assignors to the United States of America as represented by the Secretary of the Navy Application October 7, 1948, Serial No. 53,344

1 Claim. (Cl. 171—209)

The present invention relates in general to improvements in telemetry and in particular to an improved telemetric tachometer element.

In the testing of guided missiles one of the necessary operations is to transmit from the missile in flight radio signals indicative of the speed of rotation of certain elements, in particular the speed of the fuel pump shaft. Telemetric equipment already in use, forming no part of the present invention, nevertheless determines the requirements that must be met, for convenience and simplicity in adapting new apparatus. Such equipment usually depends on apparatus that provides audio frequency changes over a limited band, to modulate the radio transmitter in the missile.

An object of the invention is to provide a tachometer element that is suitable for use in the telemetric equipment of guided missiles.

Another object is to provide a tachometer element that is simple and rugged in structure, and efficient and reliable in operation.

Other objects and many of the attendant advantages of this invention will be appreciated readily as the same becomes understood by reference to the following detailed description, when considered in connection with the accompanying drawings, wherein:

Fig. 4 is a circuit diagram showing how the tachometer unit may be connected into an electronic tube circuit to produce audio frequency signals;

Fig. 5 is a view similar to Fig. 1, but on a smaller scale, showing a modified rotor which is concentrically mounted in the stator, and which differs otherwise from the form shown in Fig. 1; and Fig. 6 is a fragmentary section in the plane 6—6 of Fig. 5, but on the same scale as Fig. 1, showing the stator partly in section and the remaining structure in side elevation.

Figure 1:
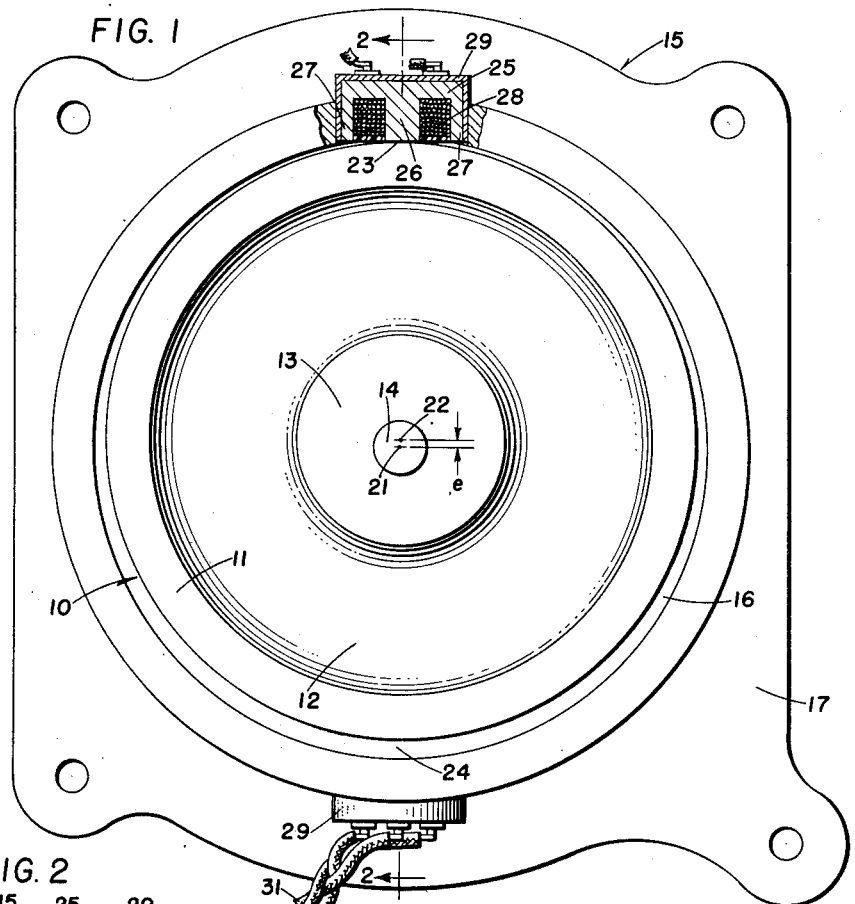
Fig. 1 is a front view of a tachometer element or unit showing an eccentrically mounted rotor and its cooperating stator, said stator being broken away at the location of one of its windings, to show the latter in section.
Figure 2:
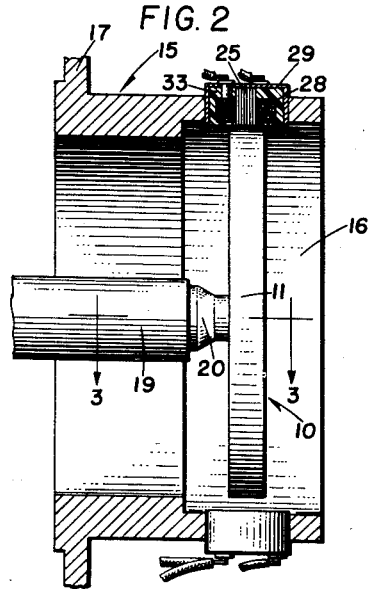
Fig. 2 is a fragmentary section, on a smaller scale, through the structures shown in Fig. 1 in the plane 2—2 of said figure, the rotor, shaft, and one of the windings being shown in side view.
Figure 3:
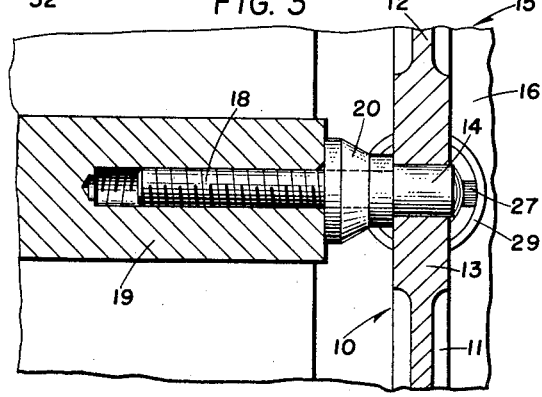
Fig. 3 is a fragmentary detail, on the same scale as Fig. 1, partly in section in plane 3—3 of Fig. 2 and showing the rotor hub and its shaft coupling.

Referring first to Figs. 1, 2 and 3, the device comprises a rotor 10, made of any suitable material and substantially in the form of a disk, and having a thickened rim 11, a web 12, and a thickened hub 13, the latter being mounted on the shaft 14. This rotor turns in the bore 16 of the stator 15 which may be in the form of a cylindrical casing, as best shown in Fig. 2, having mounting flange 17 for securing it to a support. While it is convenient to use metal as the material of the rotor and stator, other substances, such as plastics, are not excluded.

Reference to Fig. 1 shows that the center 21 of the shaft 14 does not coincide with the center 22 of the rotor, the rotor being thus eccentric to the extent $e$, equal to the distance between points 21 and 22. This results in a minimum, barely discernible, air gap at 23, and a corresponding maximum gap at 24, exceeding the radial width of the minimum gap by $2e$.

The rotor shaft 14 may conveniently have a screw-threaded portion 18 that may be screwed into a correspondingly threaded bore at the end of the shaft 19, the speed of which said shaft is to be determined, a suitable spacing collar 20 being provided on the shaft to bear against the hub 13 and the end of shaft 19 respectively, to hold the rotor 10 at the proper location within the stator 15.

It is important that at least the outer rim of the rotor 10 be made of magnetic material, preferably of high permeability, such as the alloys known as Mumetal, Permalloy, etc. It is obviously not objectionable to make the entire rim 11 or even the whole rotor of such material, but considerations of expense and machining characteristics may make it advantageous to minimize the amount of such special alloy used. High quality silicon steel, such as is used in transformer cores, is likewise suitable, but in general, the greater the permeability the better the material for this purpose.

If not the entire rotor is to be made of the magnetic material, a thin ring or hoop of the latter may be applied to the rim 11 like a tire, as by riveting it in place or forcing it into position by means of a press, or in any other suitable manner, welding being usually unsuitable however, because the accompanying heating alters the magnetic properties of the material.

Cooperating with the magnetic material of the rotor 10 are two laminated cores 25, arranged in the same general plane as said rotor, and diametrically opposite one another. It will be understood, however, that only one of these cores is intended for active use at any one time, the other being merely a reserve unit that can be substituted in case of failure of the first.

Each core is E-shaped in cross section, as shown in Fig. 1 and has a central leg 26 of twice the cross sectional area of each outer leg 27. A preferably form-wound, tapped coil 28 is placed on the leg 26 of each core, and the whole mounted in a non-magnetic casing 29, with three terminal conductors 30, 31 and 32 extending through its bottom, for connection into a circuit. Suitable potting compound 33 is introduced into the casing 29, to seal the whole against moisture and dirt, and also to hold the contents of the casing firmly in place.

Fig. 4 shows a circuit in which the unit just described may be used. Here 25 designates the core carrying the winding 28, the terminals of which are bridged by the capacitor 34, connected across conductors 30 and 32. Conductor 32 proceeds also to one end of a resistor 35, of the order of 10,000 ohms, the other end of which is connected by conductor 36 to the anode of a triode 37. The conductor 30 is connected to one side of capacitor 38, indicated as .08 mfd., and another conductor 39 leads from the other side of said capacitor to one end of resistor 40, here 6800 ohms, the other end of which is connected to the grid of the triode 37 by a conductor 41. A 100,000 ohm resistor 42 connects the conductor 39 to the ground 43 as shown. The cathode of the triode 37 is likewise connected to the ground 43. It will be understood that the values of the electrical components given are merely suggestive.

Connections are made to a reactance tube circuit of a frequency-modulated radio apparatus, through conductor 32 and the intermediate tap 31 of the coil 28. The exact location of this tap may vary, and it is not usually a center tap. The connections are shown only in part because this apparatus forms no part of the present invention. Briefly, resistors 47 and 48 in series are bridged across conductors 31 and 32, and a tap 49 from their junction is connected to the control grid of the reactance tube of the frequency modulated radio frequency transmitter. The anode current of triode 37 from a suitable source, here indicated as +90 volts, is fed through conductor 46, resistor 45, conductor 31 and part of winding 28 to conductor 32, thence through resistor 35 and conductor 36 to the anode. A by-pass capacitor 44 supplies an alternating current path to ground from the tap 31, completed through the grounded cathode of the triode 37.

Passing now to the modified form shown in Figs. 5 and 6, identical parts are designated by the same reference characters as in the form just described. It will be seen that the stator 15, shaft 19, collar 20, shaft 14 and casing 29 and its contents are identical in the two forms. The only difference is that instead of having a continuous tire or rim of magnetic material, the modified form has an arcuate strip of magnetic material 50 on its rotor 51. This magnetic material may be held in place on the non-magnetic rotor in any suitable way, as by the drive screws or rivets 52. The desired dissymmetry is thus attained because the strip of material 50 extends only partly around the rotor 51, eliminating the need of mounting the rotor eccentrically on the shaft 14.

The operation of the form shown in Figs. 1–3 is as follows: As the rotor 10 turns with the shaft 14, its rim alternately approaches and recedes from the core 25, thereby varying the reluctance of the magnetic path through said core and the adjacent part of the said rim, and consequently the inductance of the coil 28. As shown in Fig. 4, the winding 28 mounted on said core is included in the circuit of the audio frequency oscillator based on triode 37, and consequently the frequency generated by said oscillator will vary accordingly. Thus the frequency goes through its complete range and back, once every revolution of the rotor. Obviously, the audio frequency produced is a function of the rate of rotation, and thus yields a measure of the same.

In order to avoid vibration due to unbalance of the eccentrically mounted rotor, the latter is restored to dynamic balance by removing material from a portion on its heavy side, as by drilling or grinding.

The operation of the form of the invention shown in Fig. 5 is substantially the same as that already described. In this case the variation of inductance is produced by the presence or absence of the magnetic material in front of the core 25. As this occurs abruptly, the wave form of the audio frequency voltage generated by this device will tend to be square-topped, whereas in the form of Fig. 1, a nearly pure sine wave will be produced. The repetition rate of the frequency variation will not be changed thereby, however, but the square wave shape may be objectionable in some cases. An additional possibly undesirable effect of the Fig. 5 type of rotor is that each rivet 52 produces a separate small voltage pulse as it passes each leg of the core, and this will occur whether the rivets are made of magnetic or non-magnetic material.

Like the rotor 10, the rotor 51 must also be dynamically balanced, as by drilling away material from the heavy side of its rim.

Obviously many modifications and variations of the present invention are possible in the light of the above teachings. Therefore it is to be understood that within the scope of the appended claim the invention may be practiced otherwise than as specifically described.

What is claimed is:

A tachometer device for indicating the speed of a shaft, comprising a disc-like rotor connected rigidly to the shaft to rotate therewith, a cylindrical casing surrounding said rotor and being concentric with the shaft, said rotor being mounted eccentrically on the shaft, whereby, upon rotation of the shaft, the rim of the rotor smoothly approaches and recedes with respect to any given point on the casing, at least the outer rim of said rotor being composed of high permeability magnetic material, an E-shaped magnetic core mounted in said casing so that at the point of minimum spacing there is a barely discernible gap between said rotor and said core, and a winding on said core, said winding having a pair of end terminals and an intermediate terminal.

GLENN I. KIRKLAND.
GORDON E. WATERS.

REFERENCES CITED

The following references are of record in the file of this patent:

UNITED STATES PATENTS

| Number | Name | Date |
|---|---|---|
| 831,475 | Rushmore | Sept. 18, 1906 |
| 1,804,168 | Keller | May 5, 1931 |
| 2,446,761 | Harmon | Aug. 10, 1948 |

FOREIGN PATENTS

| Number | Country | Date |
|---|---|---|
| 477,584 | Great Britain | Dec. 30, 1937 |
| 230,189 | Germany | Jan. 20, 1911 |
| 175,456 | Switzerland | May 16, 1935 |